(12) United States Patent
Reiser

(10) Patent No.: US 6,699,410 B2
(45) Date of Patent: Mar. 2, 2004

(54) METHOD OF IMPREGNATING POROUS WORKPIECES

(75) Inventor: Klaus Reiser, Bad Ischl (AT)

(73) Assignee: Hoffman & Co Elektrokohle Aktiengesellschaft, Steeg (AT)

( * ) Notice: Subject to any disclaimer, the term of this patent is extended or adjusted under 35 U.S.C. 154(b) by 279 days.

(21) Appl. No.: 09/871,519

(22) Filed: May 31, 2001

(65) Prior Publication Data

US 2001/0038817 A1 Nov. 8, 2001

Related U.S. Application Data

(63) Continuation of application No. PCT/EP99/09584, filed on Dec. 7, 1999.

(30) Foreign Application Priority Data

Dec. 9, 1998 (DE) .......................... 198 56 809

(51) Int. Cl.[7] .................. B22D 19/00; B22D 19/14; C01B 31/02
(52) U.S. Cl. .................. 264/29.1; 164/98; 164/105; 164/113; 164/120; 264/259
(58) Field of Search .................. 264/29.1, 259; 164/98, 105, 113, 120

(56) References Cited

U.S. PATENT DOCUMENTS

| 4,146,119 A | 3/1979 | Ingersoll |
| 5,183,096 A | 2/1993 | Cook |
| 6,032,720 A * | 3/2000 | Riegger et al. ............... 164/98 |

FOREIGN PATENT DOCUMENTS

| DE | 2 165 111 A | 12/1971 |
| EP | 0 047 275 B1 | 9/1986 |
| EP | 0 436 143 A2 | 7/1991 |

OTHER PUBLICATIONS

S.H. Teoh et al, "Tensile and fracture properties of titanium–polymer interpenetrating network componsites", Singapore, 1996 (Journal of Materials Science Letters).
Patent Abstracts of Japan, 01113163 (May 1, 1989).
European Search Report for PCT/EP 99/09584 (Apr. 10, 2000).
German Search Report for Appl. No. 198 56 809.6 (May 10, 1999).
Inventor's Explanation of Relevance of Documents (Undated).

* cited by examiner

Primary Examiner—Leo B. Tentoni
(74) Attorney, Agent, or Firm—Alix, Yale & Ristas, LLP

(57) ABSTRACT

In order to impregnate a porous workpiece with a liquid impregnating agent, the pre-manufactured workpiece is arranged in an injection mould or diecasting mould and the liquid impregnating agent is introduced into the mould with the aid of a commercially available injection moulding or diecast moulding apparatus. To limit the need for post impregnation cleaning and/or shaping, the mould cavity is configured to closely fit the shape of the pre-manufactured workpiece. The impregnating agent may be a natural or synthetic lubricant, a plastic or, more commonly, a molten metal or metal alloy.

13 Claims, 1 Drawing Sheet

Fig. 1
Fig. 2
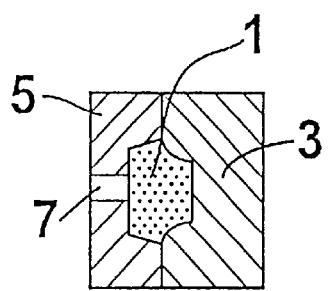
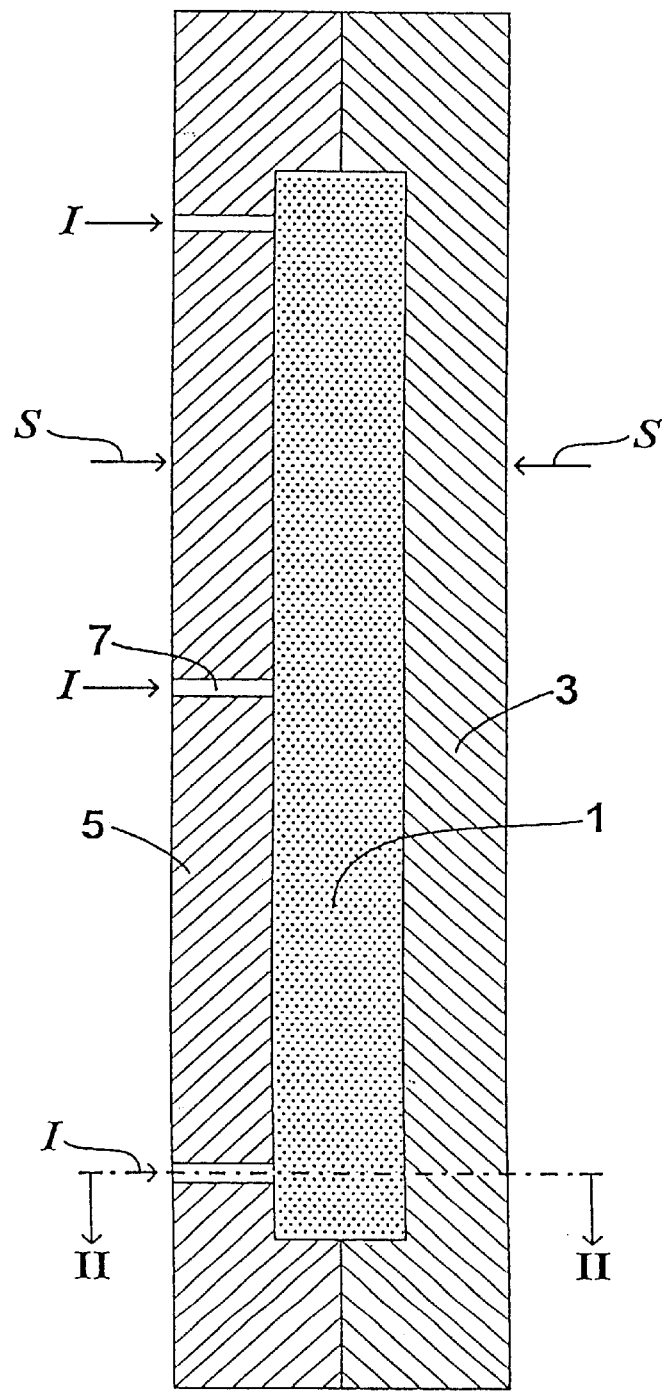

METHOD OF IMPREGNATING POROUS WORKPIECES

This application is a continuation of co-pending international application number PCT/EP 99/09584, filed Dec. 7, 1999, published as WO 00/33993.

BACKGROUND OF THE INVENTION

1. Field of the Invention

The invention relates to a method of impregnating porous work-pieces pieces, i.e. filling the pores of the workpiece with a medium which is liquid at least during the impregnation. More specifically, the invention relates to the impregnation of sintered workpieces of ceramic or in particular of carbon material, for example graphite, which are used as sliding bearings or as electrical sliding contact members such as carbon brushes or collectors. The workpiece may be impregnated with a great variety of impregnating agents for various purposes, for example with oil or grease for improving the sliding properties, with synthetic resin for improving the mechanical strength, or with metal or metal alloy for improving the electrical conductivity.

2. Description of the Related Art

The usual method of impregnating porous workpieces consists of dipping the workpiece into the liquid impregnating agent, the impregnating agent being sucked into the pores of the workpiece. If the impregnating agent is not naturally liquid, it is used in the form of a liquid solution or in the form of a melt.

Vacuum-pressure impregnating is an improvement of immersion impregnating in which the workpiece, prior to immersion into the impregnating agent, is exposed to a vacuum to make the pores void of air. After immersing the workpiece the impregnating agent is subjected to pressure to force the impregnating agent into the pores of the workpiece. This prior art impregnating method has at least the following disadvantages:

The impregnating, including the necessary preparation, for example arranging the workpieces in layers in the impregnating container, requires a great deal of time (typically for about 2 to 8 hours).

In spite of using vacuum and pressure it is difficult to obtain a pore filling which is uniform over the entire volume of the workpiece, i.e. homogeneous and complete.

Following the impregnation a complicated subsequent cleaning is necessary to remove impregnating agent residues from the surface of the workpiece. The necessary mechanical and/or chemical cleaning steps are expensive, time-consuming and frequently involve considerable environmental contamination.

SUMMARY OF THE INVENTION

Briefly stated, one preferred embodiment of the method in accordance with the present invention places the porous workpieces into a divided, tightly closable die tool, similar to that used for injection moulding or diecasting. Cavities for the porous workpieces in the die tool are configured to closely surround the workpiece on all sides. Impregnating material is injected into the clamped die tool under sufficient pressure to fill the pores of the workpiece.

It has surprisingly been found that a usual injection moulding machine or a diecasting machine can be employed to impregnate a porous workpiece arranged in the injection mould or diecast mould with a liquid or fluid impregnating agent. It has been found that with relatively short treatment times of the order of magnitude of about 1–3 minutes a substantially complete filling of the pores of the porous workpiece can be achieved. It has further been found that when using a mould having a mould cavity adapted to the shape of the workpiece and enclosing the workpiece substantially clearance-free, substantially no excess impregnating agent remains on the surface of the workpiece, making subsequent cleaning either superfluous or substantially simpler.

In a preferred method according to the invention, the cold or preheated workpiece is placed into a mould cavity of a divided, tightly closable die tool (clamping unit) of an injection moulding or diecasting machine. The clamping or closing unit is closed and the impregnating agent (liquid or brought to liquefaction temperature) is injected into the closed mould under pressure by means of the injection or diecasting unit of the machine. The mould is subjected to the pressurised liquid impregnating agent until the pores of the workpiece are completely filled, the period necessary to do this being selected based on experience.

Depending on the nature of the impregnating agent used the workpiece remains in the mould until for example the molten metal has solidified or the resin has partially or completely cured. On completion of the impregnating process, the mould is opened and the impregnated workpiece ejected by means of an ejector, after which a new cycle can begin.

By making the mould cavity an exact fit corresponding to the shaping of the workpiece, the workpiece is enclosed substantially free of clearance on all sides by the mould cavity. The gap between the workpiece and the inside surface of the mould cavity is preferably less than 100 $\mu$m and more preferably smaller than the pore size of the workpiece. It can thus be ensured that the impregnating agent injected into the mould cavity flows only into the pores and not into a gap between the workpiece and the mould cavity. Consequently, the surface of the workpiece, except for the sprue (injection) point, is not contaminated with impregnating agent. This minimises the subsequent treatment of the workpiece to the breaking off and possible grinding of the sprue.

An impregnating method according to the invention can also be carried out using a diecasting machine configured for so-called squeeze casting, or using an injection moulding machine adapted for carrying out compression moulding or injection stamping. Squeeze casting or injection stamping are terms denoting methods in which at the start of the casting or injection process the two halves of a diecasting mould or injection mould are not pressed against each other with the full clamping force. Although in this state the mould cavity is already sealed, it still has a certain excess dimension compared with the dimensions when the mould halves are completely pressed against each other. The mould halves can move apart slightly under the pressure of the injected melt. The complete pressing together of the mould halves takes place after completion of the casting or injection operation.

When the impregnating method according to the invention is carried out on a diecasting or injection moulding machine configured for this procedure, there is advantageously still a small gap present between the wall of the mould cavity and the inserted workpiece at the start of the casting or injecting operation. This gap permits the liquid impregnating agent to spread uniformly over the surface of the workpiece. On final clamping of the mould halves this gap disappears and the liquid impregnating agent is mechanically forced into the pores of the workpiece.

With the method according to the invention the cycle time is substantially reduced when compared with conventional impregnating methods. Both the actual impregnating operation and the pretreatment (insertion of the workpiece into the mould cavity and closing the mould) as well as the subsequent treatment (opening the mould, removing the workpiece and if necessary removing the sprue) can be carried out in a very short time. A cycle time of 3 minutes can be achieved, for example, compared with the conventional method in which for each of the three phases requires about 1 to 4 hours.

According to another aspect of the invention, a method of impregnating can easily be automated. Depending on the nature of the workpiece, a multiple die with several mould cavities may also be employed, thereby again considerably reducing the processing time. Fundamentally, the method can be carried out with commercially available injection moulding or diecasting machines as generally employed for the injection moulding of plastics and the diecasting of metals.

A further advantage of the method according to the invention resides in that many impregnating agents, such as waxes, resins and the like, which in the prior art could only be used in the form of a solution with a solvent, can be employed free of solvent. This makes it possible to carry out the method according to the invention in a manner substantially more compatible with the environment than prior art impregnating methods. Additionally, workpieces having very different porosities can be impregnated, for example porosities in the range of from 2% to 90%.

The method is preferably employed for workpieces of carbon which are to be used as sliding bearings or electrical sliding contacts in the form of carbon brushes or collectors. Preferably, the carbon bodies are made by mixing one or more of the components natural graphite, electrographite, pyrographite, carbon fibre, coke and carbon black with a binder such as coal or petroleum tars and pitches as well as resins. The workpieces are subsequently shaped by means of pressing, ramming or extruding. Usually, the workpieces are subjected to a multistage temperature treatment taking place at between 100° C. and 3200° C. (for sintering, hardening, carbonising or graphitisation). The workpiece can also be made by preforming carbon fibre strands, mats, fabrics or knitted products, possibly including binding, as necessary for dimensional stability, with coal or petroleum tars or pitches or plastic resin, and subsequent temperature treatment between 100° C. and 3200° C.

The impregnating agents that can be used include:
natural or synthetic oils, fats, greases or waxes;
natural or synthetic resins, including synthetic resins made by modifying natural resins, such as by esterification or saponification;
plastics which have been made by polymerisation, polyaddition or polycondensation and can be brought into the flowable state necessary for impregnation;
all metals or metal alloys;
pretreated or untreated pitches.

The impregnating agent can be supplied to the closed mould containing the workpiece at one supply point or at several supply points. Mouldings which have been made for example from a pulverulent carbon material by compression or extrusion and subsequent sintering frequently have a preferred direction of the porous structure, the preferred direction lying perpendicular to the pressing direction or parallel to the extrusion direction. With such workpieces, it may be preferred to arrange the supply point of the impregnating agent on the mould in such a manner that the propagation direction of the impregnating agent in the mould cavity or through the bores of the workpiece extends substantially parallel to the preferred direction.

However, it has been found that this is not necessary as a rule. With workpieces having an anisotropic or preferred direction of the porosity the impregnating agent can be supplied at any point of the workpiece and the movement of the impregnating agent in the workpiece will take place in any direction relatively to the preferred direction. The resulting impregnation is just as uniform and homogeneous as with isostatically compressed mouldings not having any preferred direction.

An object of the present invention is to provide a new and improved method of impregnating porous workpieces.

Another object of the present invention is to provide a new and improved method of impregnating porous workpieces that requires a short treatment time to produce a very homogeneous and complete pore filling.

A further object of the present invention is to provide a new and improved method of impregnating porous workpieces which substantially eliminates the need for mechanical and/or chemical cleaning steps following impregnation.

These and other objects, features and advantages of the invention will become readily apparent to those skilled in the art upon reading the description of the preferred embodiments, in conjunction with the accompanying drawings.

BREIF DESCRIPTION OF THE DRAWINGS

FIG. 1 shows a longitudinal section of a diecasting mould having a porous workpiece inserted therein; and FIG. 2 is a section along the line II–II of FIG. 1.

DETAILED DESCRIPTION OF THE PREFERRED EMBODIMENTS

With reference to FIG. 1, a workpiece 1 to be impregnated has the form of an elongated slide contact for mounting on the collector of an electrical track vehicle. The workpiece 1 consists of a sintered porous carbon material. It is made with very exact dimensional form by a shaping operation, for example extruding or pressing, and a subsequent heat treatment (sintering). The workpiece 1 is then inserted into a diecasting mould consisting of two mould halves 3, 5, the cavity of which is made to correspond exactly to the dimensions of the workpiece 1. The diecasting mould has injection passages 7 arranged at several points distributed over its length. These are not employed for injection of a diecasting material to shape a workpiece, as in normal die-casting, but to inject a liquid impregnating agent for filling the pores of the porous workpiece 1 already present in the mould cavity. Diecasting machines having a clamping unit and a casting unit are known to persons skilled in the art. Attention is drawn for example to Lueger, Lexikon der Technik, Volume 8, headings "Diecasting" and "Die-casting machine".

After insertion of the workpiece 1, the two mould halves 3, 5 are secured to clamping plates of the closing or clamping unit of the diecasting machine and are closed and subjected to a clamping force S. Thereafter, impregnating agent is forced in the direction of the arrows I under suitable injection pressure via the injection passages 7 into the mould so that it homogeneously fills the pores of the workpiece 1. The impregnating agent is pressurised by the casting unit of the diecasting machine. The workpiece 1 is preferably preheated to a suitable temperature before insertion into the mould or before injection of the impregnating agent.

As an example, impregnation (infiltration) of a slide contact 1 of carbon material was carried out with molten aluminium silicide AlSi12 with the following parameters. The die-casting machine used was a standard machine of the Bühler company, with 250 tons clamping pressure. The work-piece was preheated to 650° C. for 2 minutes was inserted into the die-casting mould preheated to 250° C. The casting mould was subjected to a clamping pressure of 250 tons. The molten impregnating agent (AlSi12) at a temperature of 650° C. was injected into the mould under a pressure of 200 bar via the injection passages 7. The injection pressure of 200 bar was maintained for a total of 3 seconds. Thereafter the mould was opened and the impregnated workpiece 1 removed. A very uniform filling of the pores with the impregnating agent and a surface free from impregnating agent were found. For this reason, subsequent working of the impregnated workpiece can be restricted to knocking off or grinding away the sprues remaining in the region of the injection passages 7. The machine can be operated with a cycle time of about 3 minutes.

Instead of a diecasting machine, a conventional injection moulding machine can also be employed in accordance to the present invention. The injection moulding machine can be of any desired type as described in the technical literature, for example the book "Kunststoffmaschinenführer", by F. Johannaber, Hanser-Verlag, Munich, 1992. Depending on the nature of the impregnating agent used, the plastifying and injection unit comprising a screw may possibly also be employed for injecting the liquid impregnating agent. Otherwise, the usual plastifying and injection unit comprising a screw can be replaced by a simple injection unit with a piston for injecting the liquid impregnating agent.

When a metal alloy, in particular an aluminium or magnesium alloy, is used as impregnating agent in the method according to the invention, an injection moulding machine operating by the so called thixomoulding method can be used for the impregnation. Thixomoulding takes advantage of the fact that certain alloys of these metals have a thixotropic transition phase between the solid and liquid phases. For the injection moulding of shaped bodies from such alloys it is known to heat said alloys in the screw unit of an injection moulding machine to the temperature corresponding to the thixotropic state, with the action of the rotating screw limiting the crystal growth, and to inject the metal alloy in this thixotropic state into the injection mould. The impregnating method according to the invention can be carried out in similar manner as well, the porous workpiece to be impregnated with the thixotropic metal alloy being arranged in the injection mould.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A method for pore-filling impregnation of a porous workpiece of carbon material with an impregnating agent comprising a liquid-state metal or metal alloy which is liquid at least during the impregnation, the porous workpiece being prefabricated prior to impregnation by mixing a pulverulent or fibrous carbon material with a binder, shaping the mixture into a shaped body by compression, ramming or extrusion and subsequent heat treatment for sintering, hardening, carbonising and/or graphitisation of the workpiece, said method comprising the steps of:

providing a closable mould configured to be compatible with an injection moulding press, said mould having at least one mould cavity closely adapted to the shaped body of the workpiece;

arranging the workpiece in the mould cavity;

closing the mould; and injecting an impregnating agent into the mould cavity under pressure by means of an injection moulding apparatus.

2. The method of claim 1, further comprising providing a mould cavity wherein there is substantially no clearance between the mould and the workpiece.

3. The method of claim 1, wherein said mould comprises two mould halves and said method further comprises:

providing a mould in which the two mould halves are not completely pressed against each other at the start of the injection operation so that the mould cavity is overdimensioned compared with the workpiece arranged therein permitting impregnating agent to flow into a gap between the workpiece and the mould; and pressing the mould halves together so that the impregnating agent in the gap between the mould and the workpiece is thereby mechanically forced into the pores of the workpiece.

4. The method of claim 1, further comprising heating the workpiece prior arranging the workpiece in the mould cavity.

5. The method of claim 1, further comprising heating the workpiece during the step of injecting.

6. A method for pore-filling impregnation of a porous workpiece of carbon material with an impregnating agent comprising a liquid-state metal or metal alloy which is liquid at least during the impregnation, the porous workpiece being prefabricated prior to impregnation by mixing a pulverulent or fibrous carbon material with a binder, shaping the mixture into a shaped body by compression, ramming or extrusion and subsequent heat treatment for sintering, hardening, carbonising and/or graphitisation of the workpiece, said method comprising the steps of:

providing a closable mould configured to be compatible with a die casting apparatus, said mould having at least one mould cavity closely adapted to the shaped body of the workpiece;

arranging the workpiece in the mould cavity;

closing the mould; and injecting an impregnating agent into the mould cavity under pressure by means of said die casting apparatus.

7. The method of claim 6, further comprising providing a mould cavity wherein there is substantially no clearance between the mould and the workpiece.

8. The method of claim 6, wherein said mould comprises two mould halves and said method further comprises:

providing a mould in which the two mould halves are not completely pressed against each other at the start of the injection step so that the mould cavity is overdimensioned compared with the workpiece, permitting impregnating agent to flow into a gap between the workpiece and the mould; and pressing the mould halves together so that the impregnating agent in the gap between the mould and the workpiece is thereby mechanically forced into the pores of the workpiece.

9. The method of claim 6, further comprising heating the workpiece prior arranging the workpiece in the mould cavity.

10. The method of claim 6, further comprising heating the workpiece during the step of injecting.

11. A method for pore-filling impregnation of a porous workpiece of carbon material with an impregnating agent, the porous workpiece being prefabricated prior to impregnation by mixing a pulverulent or fibrous carbon material with a binder, shaping the mixture into a shaped body by compression, ramming or extrusion and subsequent heat treatment for sintering, hardening, carbonising and/or graphitisation of the workpiece, said method comprising the steps of:

providing a closable mould having at least one mould cavity closely adapted to the shaped body of the workpiece;

arranging the workpiece in the mould cavity;

closing the mould; and injecting an impregnating agent into the mould cavity under pressure provided by one of an injection moulding or die casting apparatus.

12. The method of claim 11, wherein the impregnating agent is a metal or a metal alloy in the molten state.

13. The method of claim 11, wherein the impregnating agent is a natural or synthetic oil, fat, grease, wax, resin or a plastic made by polymerisation, polyaddition or polycondensation.

* * * * *